United States Patent [19]

Rashleigh et al.

[11] Patent Number: 4,536,088
[45] Date of Patent: Aug. 20, 1985

[54] POLARIMETRIC FABRY-PEROT SENSOR

[76] Inventors: Scott C. Rashleigh, 5803 Queens Gate Ct., Alexandria, Va. 22303; Samuel J. Petuchowski, 7549 Spring Lake Dr., Bethesda, Md. 20783

[21] Appl. No.: 419,257

[22] Filed: Sep. 17, 1982

[51] Int. Cl.³ .............................................. G01B 9/02
[52] U.S. Cl. .................................. 356/351; 250/227
[58] Field of Search ................. 356/351, 352; 250/227; 374/161

[56] References Cited

U.S. PATENT DOCUMENTS

| 4,180,328 | 12/1979 | Drain | 356/349 |
| 4,215,938 | 8/1980 | Farraud et al. | 356/358 |
| 4,442,350 | 4/1984 | Rashleigh | 250/227 |

FOREIGN PATENT DOCUMENTS 2020419 11/1979 United Kingdom ............... 250/227

OTHER PUBLICATIONS

S. J. Petuchowski et al., A Sensitive Fiber Optic Fabry-Perot Interferometer, IEEE Journal of Quantum Electronics, vol., QE-17, pp. 2168-2170, Nov. 1981.

Birnbaum et al., "A Sensitive Interferometric Null Method for Measuring Stress-Induced Birefringence", Conference: *Laser Induced Damage in Optical Materials,* Boulder, Col., 1973.

Primary Examiner—Davis L. Willis
Assistant Examiner—Matthew W. Koren
Attorney, Agent, or Firm—Robert F. Beers; William T. Ellis; Charles S. Guenzer

[57] ABSTRACT

A polarimetric Fabry-Perot sensor comprising a source of coherent polarized light, an optical cavity, preferably an optical fiber, capable of supporting two independent modes of that light and coated with partially reflecting material on both ends, a sensing element for detecting the external field that differentially affects the two modes, and means for measuring interference between the two modes.

13 Claims, 12 Drawing Figures

POLARIMETRIC FABRY-PEROT SENSOR

BACKGROUND OF THE INVENTION

This invention relates in general to a sensor system and in particular to a sensor system utilizing an improved interferometer.

A sensor is a device that responds to a physical stimulus or field and transmits a resulting response. Different sensors respond to different fields such as pressure, temperature, electric field, magnetic field, electromagnetic radiation or a host of other phenomena. The type of sensor considered here is an analog device so that the larger the field, within certain limits, the larger the resulting response. Thus the sensor can be considered to incorporate as its sensing element a conversion device that converts an evanescent or difficult to quantify field to another easily measured quantity. In this application, the sensing element converts the external field to a modulation of some parameter of an optical system, e.g. a change of the index of refraction in an optical fiber. Various techniques are available that monitor this modulation.

Oftentimes, the magnitude of the field does not need to be measured. Instead, small variations in the field over time will contain a signal of interest. This signal may be the carrier frequency of an infrared communication system that operates against a warm background or it may be a transient magnetic anomaly much smaller than the ambient terrestrial magnetic field. Of course, fields and signals are not limited to the cited examples.

The sensitivity of sensors is often limited by the physical mechanism relied upon in the conversion process of the sensing element. For instance, a method of measuring a magnetic field uses a magnetostrictive material mechanically bonded to an optical fiber to modulate the optical phase length of the fiber. The amount of magnetostriction, i.e. the dilation per unit of magnetic field, is limited in the materials currently available. Nonetheless, such a sensor can be improved by increasing the sensitivity of the optical system to minute changes in its properties and by compensating for various sources of noise.

This application describes techniques and apparatus for increasing the sensitivity of the optical system associated with a sensing element which detects an external field. An adequate sensing element is assumed to exist for whatever field is desired to be detected. For example, Yariv and Winsor describe a magnetostrictive sensor for magnetic fields in Optics Letters, vol 5, 1980, pages 87–89. Other sensing elements exist for other fields.

In one of the simplest fiber optic sensor systems, called a two fiber Mach-Zehnder sensor a source of coherent light excites an optical fiber. The beam is then coupled to a second fiber by means of a directional coupler such that waves of equal amplitude are propagating in both fibers with a fixed phase relation to each other. The sensing element appropriate for the external field is placed on one of the fibers, called the detection fiber. The other fiber, called the reference fiber, is isolated from the field to be measured. At a point at which the wave has passed the sensing element, the detection fiber is coupled to the reference fiber at another directional coupler which causes the wave on one fiber to interfere with the wave on the other fiber. The changes in interference caused by the modulation introduced in the detecting fiber can be used as a measure of the external field.

In mathematical terms, the first directional coupler impresses upon both fibers optical waves of frequency $\omega$ and of equal complex amplitude $E_o$. If the physical length of the detection fiber is $L_1$ and its unmodulated refractive index for the light mode of interest is n, then its phase length is given by:

$$\phi_1 = n \cdot L_1 \cdot \omega / c \quad (1)$$

where c is the speed of light. Likewise the reference fiber has a phase length $\omega_2$. In addition, the sensing element introduces in the detecting fiber a phase modulation $\phi(P)$ caused by the external field P.

After the waves have been recombined in the second directional coupler, each fiber contains a wave of complex amplitude $$E_D \frac{1}{2} E_o (e^{i(\phi_1 + \phi(P))} + e^{i \cdot \phi_2}) \quad (2)$$

The behavior of the interferometer is describable in terms of the differential phase length $$\phi_D = \phi(P) + \phi_1 - \phi_2 \quad (3)$$

One of the fibers after the second directional coupler connects to an optical detector, the response of which is much slower than $\omega$, so that the detector's output is proportional to $E_D E_D^*$. Thus the static sensitivity $S_S$, the ratio of the intensity at the detector to the input intensity, is given for the Mach-Zehnder sensor as $$S_{S,MZ} = f_{MZ}(\phi_D) = \frac{1}{2}(1 + \cos \phi_D) \quad (4)$$

This sensitivity is dependent only on the phase difference $\phi_D$ and varies trigonometrically with it. Since in many applications a small signal is impressed on a larger constant field, a more useful sensitivity is the dynamic sensitivity, which is the derivative of $S_S$ with respect to the field impressed phase, i.e.

$$S_{D,MZ} = dS_{S,MZ}/d\phi(P) = -\frac{1}{2}\sin \phi_D \quad (5)$$

Thus in operation, a Mach-Zehnder is set to the point of steepest slope of $S_S$, which is where $\phi_D$ is an odd multiple of $\pi/2$, in order to obtain the highest $S_D$.

The usefulness of the Mach-Zehnder interferometer is limited by several factors. First the dynamic sensitivity is not all that great, as will be seen later. Secondly, the two fibers are unintentionally subjected to slightly different environmental noise, such as temperature fluctuations, which cause a differential shift in the phase $\phi_1(Noise_1) - \phi_2(Noise_2)$ which is indistinguishable from the phase signal $\phi(P)$. Thirdly solid state lasers are usually used to provide the coherent light. These lasers however are subject to small random fluctuations in frequency. The impact of these fluctuations can be seen if Eq. (3) is rewritten in terms of Eq. (1) as $$\phi_D = \phi(P) + n \cdot (L_1 - L_2) \cdot \omega / c \quad (6)$$

Unless the lengths of the two fibers, $L_1$ and $L_2$, are closely matched in length, then fluctuations in $\omega$ are indistinguishable from field induced phase shifts $\phi(P)$. This frequency fluctuation noise is called phase noise.

The last two problems of differing environments and phase noise for a Mach-Zehnder interferometer are greatly alleviated in a single fiber polarimetric interferometric sensor. Rashleigh describes such an acoustic sensor in Optic Letters, vol. 5, 1980, pages 392-394. This polarimetric sensor requires an optical fiber which can support two independent light modes of the same frequency but of mutually perpendicular polarization. This sensor further requires a sensing element which differentially shifts the phase of one of the modes. If the two modes are the x-mode and y-mode, the field produces a differential phase shift $$\delta\phi(P) = \phi_x(P) = \phi_y(P) \tag{7}$$

Rashleigh obtained an interference pattern by placing a Wollaston prism with its axis at 45° to both the x- and y-mode of the fiber. Separate optical detectors measured the intensity of the two beams produced by the Wollaston prism. Electronic circuitry produced a signal proportional to the difference of the intensities. The phase dependence of the difference signal produces a sensitivity very similar to that of Eq. (4). However, phase noise and many sources of environmental noise are eliminated because they are common-mode, i.e. affect both x- and y-modes equally. Nonetheless the sensitivity of the single fiber polarimetric interferometer is somewhat less than that of the Mach-Zehnder because of the use of a differential sensing element.

Sensitivity is greatly increased in a Fabry-Perot interferometer. Petuchowski, Giallorenzi and Sheem describe a fiber-optic Fabry-Perot interferometer in IEEE Journal of Quantum Electronics, vol. QE-17, 1981, pages 2168-2170. The ends of an optical fiber are made highly but not completely reflecting with reflection coefficients of $r_1$ and $r_2$. A coherent light source launches a light wave through one end of the fiber. A sensing element modulates the phase of the wave. An optical detector measures the intensity of the light transmitted through the other end of the fiber. The light wave interferes with itself as it reflects between the two ends. The static sensitivity is the transmission coefficient of the interferometer given by $$S_{S,FP} = T_{max} \cdot f_{FP}(\phi) \tag{8}$$

where $$T_{max} = (1-r_1)^2 \cdot (1-r_2^2)/(1-a \cdot r_1 \cdot r_2) \tag{8}$$

and the attenuation per pass is $(1-a)$. The phase dependent factor is given by $$f_{FP}(\phi) = (1 + \rho \cdot \sin^2 \phi)^{-1} \tag{10}$$

where $\rho$ is defined as .

$$\rho = 4 \cdot a \cdot r_1 \cdot r_2/(1 - a \cdot r_1 \cdot r_2)^2 \tag{11}$$

Inspection of Equations (10) and (11) shows that for relatively high reflection coeffiecients, the static sensitivity is strongly peaked near the resonances where the reflecting light positively interferes and results in significant transmission. As a result the dynamic sensitivity can be very large if the interferometer is operated on the side of the peak of Equation (10).

Thus a Fabry-Perot interferometric sensor can exhibit much higher sensitivity than a Mach-Zehnder system. However the high sensitivity applies to noise as well as signal. As described thus far there are no noise cancelling properties inherent in the Fabry-Perot interferometer so that noise is even more troublesome than for the Mach-Zehnder interferometer.

SUMMARY OF THE INVENTION

Therefore an object of this invention is to provide an interferometric sensor of high sensitivity.

Another object of this invention is to provide an interferometric sensor that is insensitive to environmental and phase noise.

A further object of this invention is to provide a simple fiber optic sensor.

The present invention is a polarimetric Fabry-Perot interferometric sensor which has the sensitivity of a Fabry-Perot interferometer and the noise rejection of a single fiber polarimetric interferometer. An optical cavity, preferably a single-mode optical fiber, is used which can support two independent and mutually polarized light modes. The two ends of the fiber are highly reflecting but partially transmitting. A sensing element that differentially affects the two modes couples the signal into the fiber. A coherent light source launches both modes into the fiber. The fiber is near resonance for both modes at some time during the detection process. The differential mode interferometer signal is used to monitor the signal of the inducing field. One way of extracting the differential mode signal is to apply a dither signal to a common-mode phase shifter on the fiber. Optical detectors, positioned to detect the intensities of the two modes split by a Wollaston prism, feed into lock-in amplifiers tuned to the dither signal. Feedback loops from the lock-in amplifiers control the fine tuning of the common-mode phase shifter and a differential mode phase shifter. The amount of differential mode phase shift varies with the external field.

BRIEF DESCRIPTION OF THE DRAWINGS

FIG. (1a) is a schematic Mach-Zehnder sensor as practiced in the prior art.

FIG. (1b) is a plot of the dependence of the intensities of the sensor of FIG. (1a) upon phase.

Figure 1A:
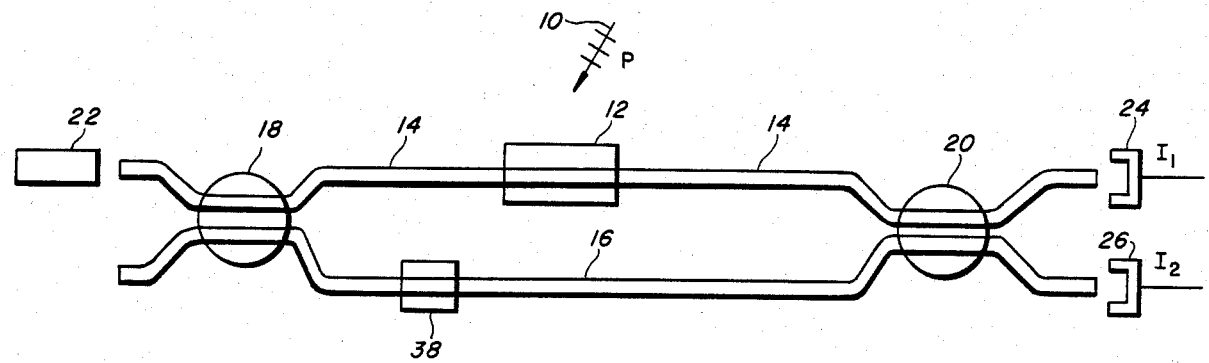
Figure 1B:
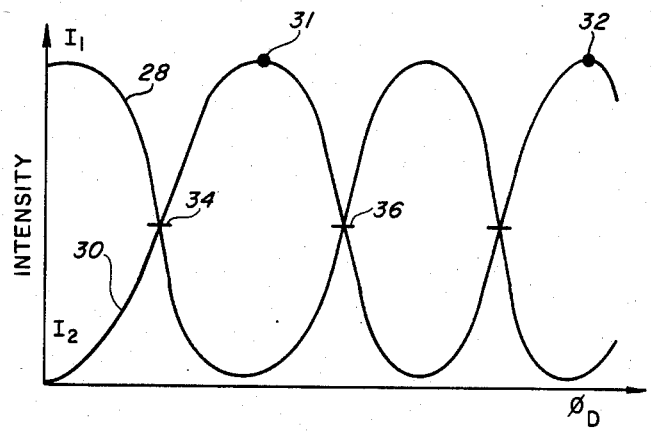
Figure 2A:
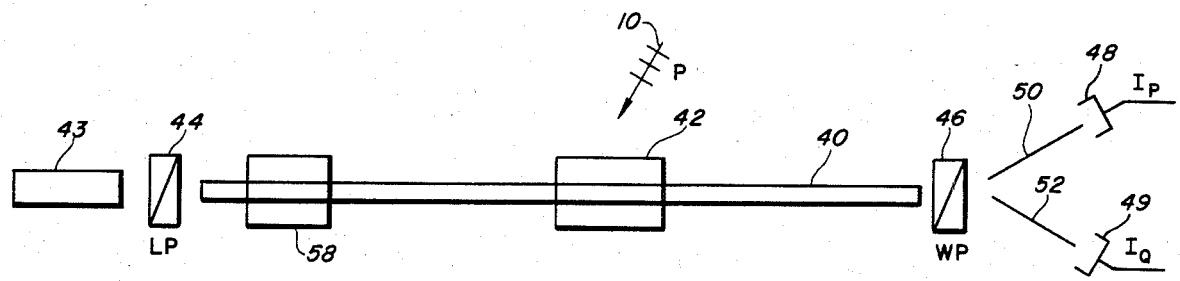
Figure 2B:
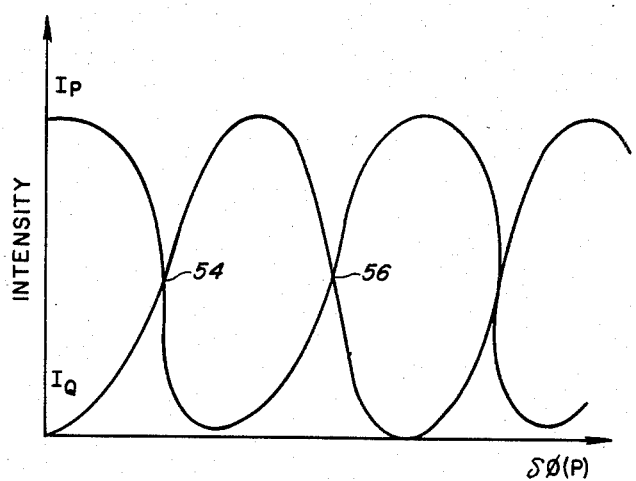
Figure 3A:
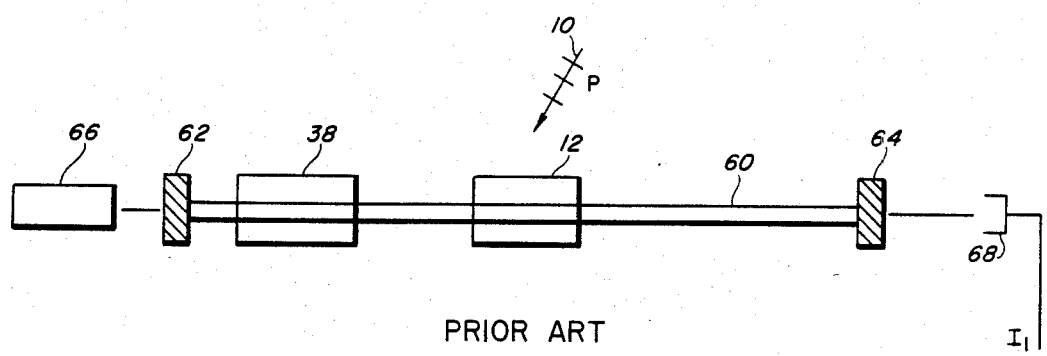
Figure 3B:
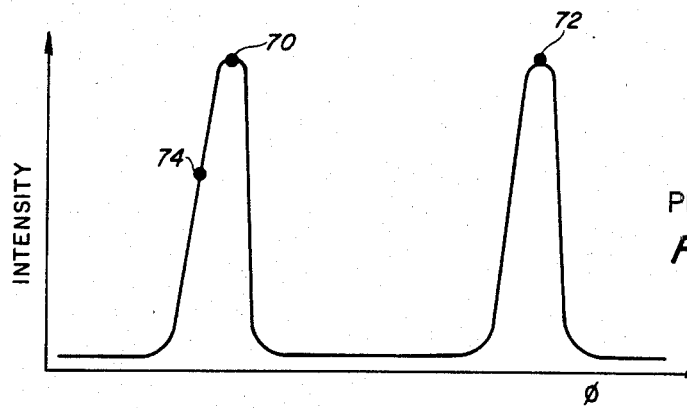
Figure 4A:
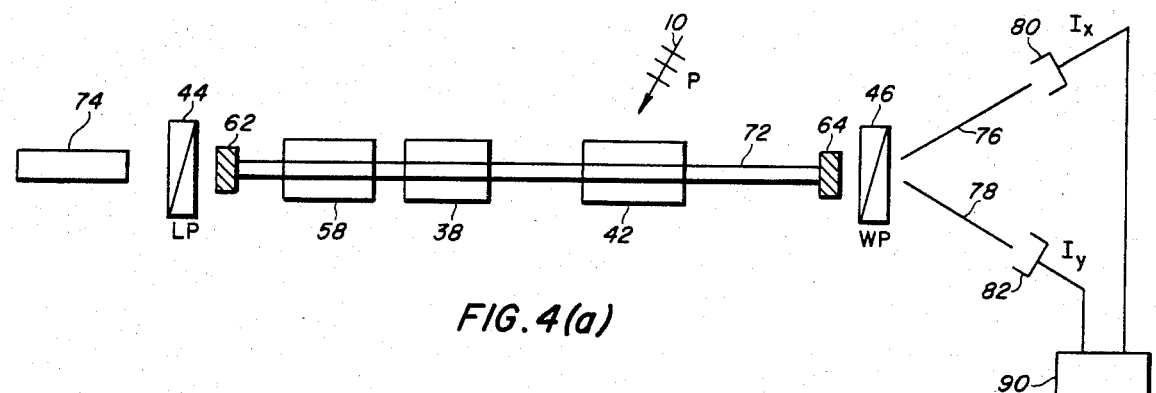
Figure 4B:
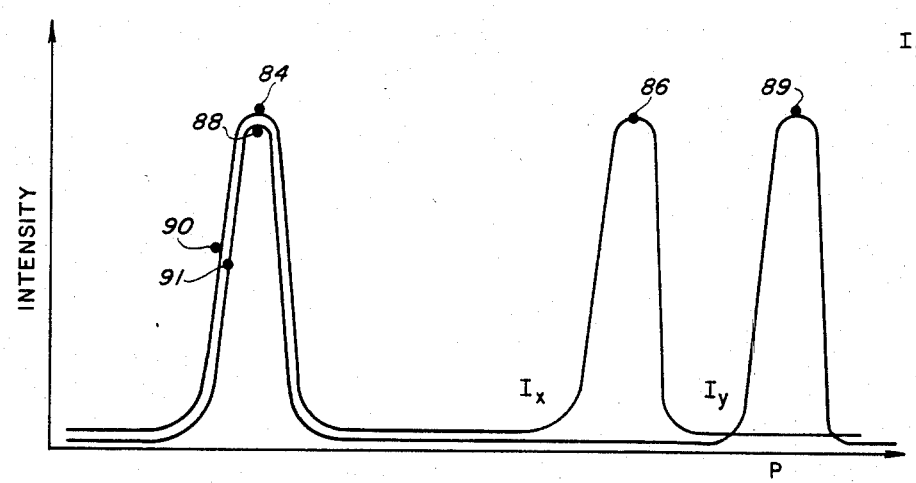
Figure 5A:
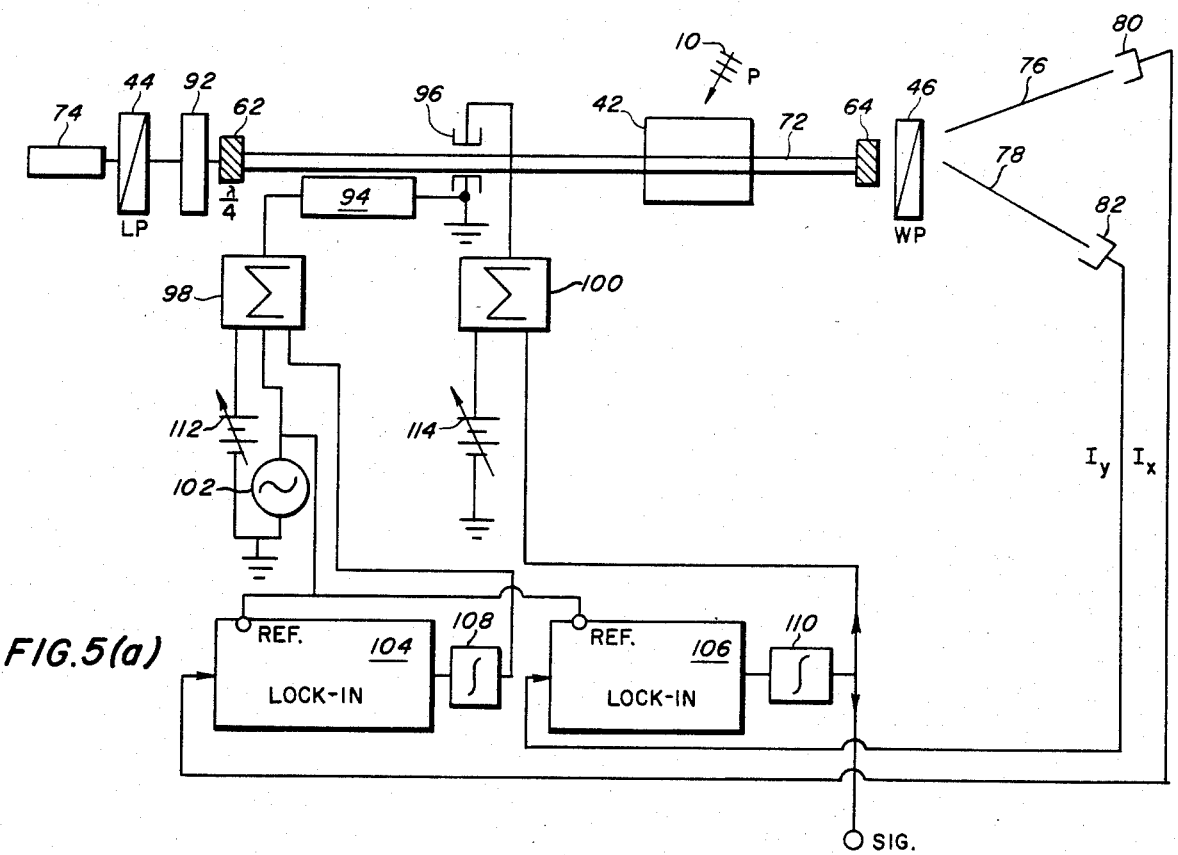
Figure 5B:
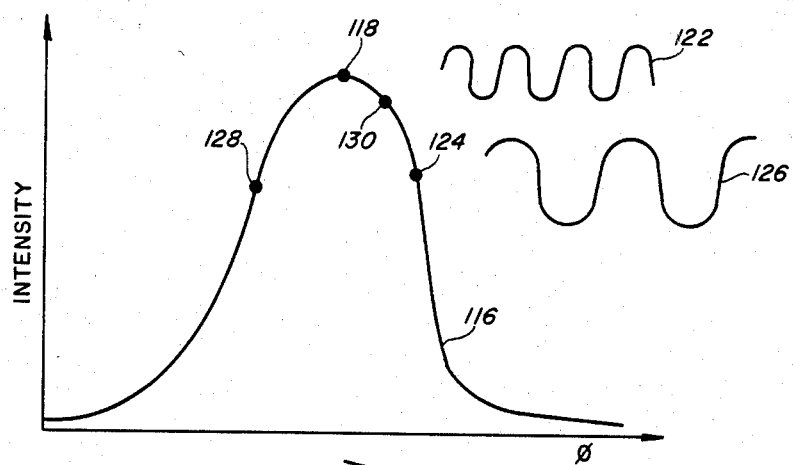
Figure 6A:
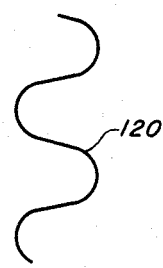
Figure 6A:
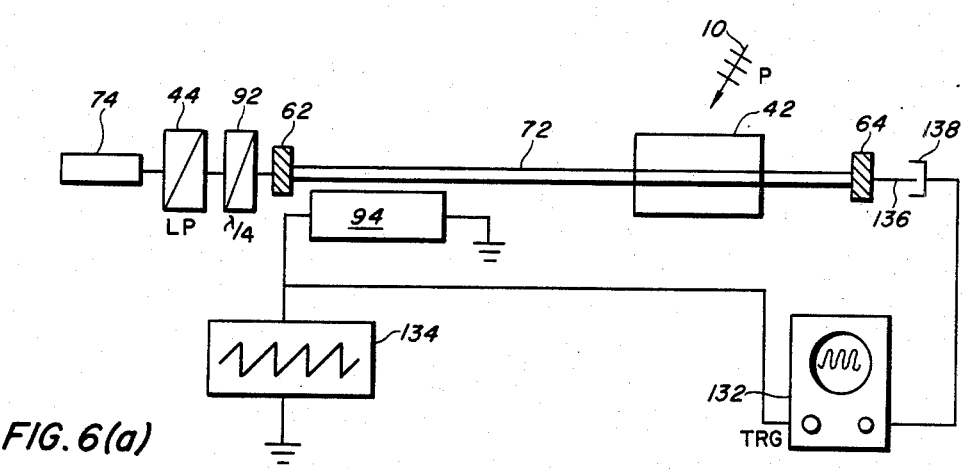
Figure 6B:
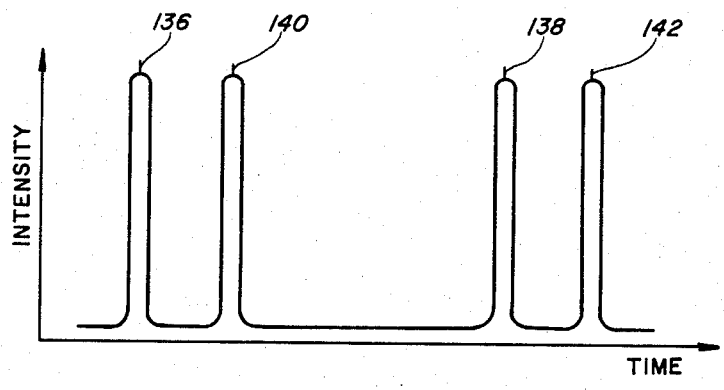

FIG. (2a) is a schematic representation of a single fiber polarimetric interferometric sensor as practiced in the prior art.

FIG. (2b) is a plot of the dependence of the intensities of the sensor of FIG. (2a) upon phase.

FIG. (3a) is a schematic representation of a Fabry-Perot sensor as practiced in the prior art.

FIG. (3b) is a plot of the dependence of the intensities of the sensor of FIG. (3a) upon phase.

FIG. (4a) is a schematic representation of an embodiment of the polarimetric Fabry-Perot sensor of this invention.

FIG. (4b) is a plot of the dependence of the intensities of the sensor of FIG. (4b) upon the external field.

FIG. (5a) is a schematic representation of another embodiment of the polarimetric Fabry-Perot sensor of this invention using feedback compensation.

FIG. (5b) is a plot of the dependence of one of the intensities of the sensor of FIG. (5a) upon phase.

FIG. (6a) is a schematic representation of another embodiment of the polarimetric Fabry-Perot sensor of this invention using phase sweeping.

FIG. (6b) is a representation of the oscilloscope display of FIG. (6a).

DETAILED DESCRIPTION

The present invention can best be appreciated by reviewing in detail the prior art and the advantages and disadvantages of the various interferometers. Although all the examples cited will use optical fibers, it is to be noted that the invention does not require optical fibers. Any sort of electromagnetic radiation that will resonate in a cavity, that has two mutually polarized modes, and for which a differential sensing element can be fabricated can be utilized in this invention.

A two-fiber Mach-Zehnder interferometric sensor is shown in FIG. (1a). The field to be detected P 10 is incident upon a sensing element 12 coupled to the detection fiber 14. A separate reference fiber 16 of the same construction and length as the detection fiber 14 is isolated from the field P 10. The two fibers are coupled together at a first directional coupler 18 and a second directional coupler 20 placed on opposing sides of the sensing element 12. A laser 22, usually a solid state diode laser, is positioned to shine into one of the fibers 14 or 16. Optical detectors 24 and 26 positioned at the ends of the fibers 14 and 16 opposite the laser 22 produce signals $I_1$ and $I_2$ proportional to the intensity of the light on the respective fibers 14 and 16. The external field P 10 produces a phase shift $\phi(P)$ which is a function of P, preferably a linear function.

The dependence of the intensities upon phase is shown in FIG. (1b). In operation, the Mach-Zehnder sensor of FIG. (1a) is operated with an arbitrarily sized phase added to the phase shift $\phi(P)$ so that the phase axis of FIG. (1b) can be either $\phi(P)$ or the phase difference $\phi_D$ of Equation (3). The intensities of $I_1$ shown in curve 28 and of $I_2$ shown in curve 30 vary sinusoidally with $\phi_D$ with successive peaks 31 and 32 separated by $\pi$ in phase. For greatest dynamic sensitivity, the Mach-Zehnder is operated near one of the quadrature points 34 or 36 by introducing additional phase in one of the fibers 16 by a phase shifter 38 as shown in FIG. (1a) which adds a controllable amount of phase.

As previously discussed, the Mach-Zehnder interferometer suffers from phase noise originating from frequency fluctuations in the laser 22 or environmental noise differences between the two fibers 14 and 16.

A single-fiber polarimetric interferometric sensor shown in FIG. (2a) has much improved immunity to noise. The optical fiber 40 is one that supports two independent and orthogonal light modes. In a perfect fiber, there is a two-fold degeneracy for light modes propagating along the z-direction. The lowest order x-mode has its electric field along the x-direction, while that of the y mode is along the y-direction. However optical fibers tend to contain imperfections that cause modes to be coupled and thus mix the modes. Small amounts of coupling are acceptable for polarimetric interferometers as long as the modes are largely independent. Improved polarization maintaining fibers are currently undergoing development. Levi describes single mode optical fibers in his text Applied Optics, volumes 1 and 2, herein incorporated by reference. Such single mode optical fibers have acceptable capability for polarization maintainance for use in polarimetric interferometers. Alternatively a small amount of birefringence, i.e. different refractive indices for the two modes, can be introduced in the fiber 40 so that the two mutually polarized modes are no longer degenerate. Decreased degeneracy between modes decreases the amount of coupling between those modes.

The external field P 10 to be detected impinges on a differential mode sensing element 42 which affects the two modes in different amounts, for example by introducing phase shifts differing by $\delta\phi(P)$ in the two modes. Rashleigh's acoustic sensor is one such sensor.

Two equal amplitude modes are launched in the fiber 40 by a laser 43 by such means as inserting a linear polarizer 44 into the laser beam with its polarization axis set at 45° between the perpendicular polarization directions of the two modes. At the exit port of the fiber is set a Wollaston prism 46, the polarization axis of which is set at 45° to the two modes. Two optical detectors 48 and 49 measure the intensities of the two beams 50 and 52 divided by the Wollaston prism 46. The intensities of the two beams, given by $I_P$ and $I_Q$, are plotted in FIG. (2b) as a function of the differential phase $\delta\phi(P)$. The sensitivity of the sensor is maximized if it is operated at one of the quadrature points 54 and 56 which can be accomplished by use of a differential phase shifter 58 shown in FIG. (2a) which differentially shifts the phase in the two modes.

The single fiber polarimetric interferometric sensor eliminates the sources of noise which are common mode but its sensitivity shown in FIG. (2b) is even less than that of the Mach-Zehnder shown in FIG. (1b).

The Fabry-Perot sensor exhibits greatly increased sensitivity. A Fabry-Perot sensor shown in FIG. (3a) uses a single optical fiber 60. A length of 30 cm for the fiber 60 is typical. Each end of the fiber 60 is coated with a highly reflecting material 62 and 64 with respective reflectivities $r_1$ and $r_2$. The highly reflecting coating may be of multiple dielectric layers as described by Levi which produce high reflectivies with low losses. Alternatively the ends of the fiber can be butted up to such stacks of multiple dielectric layers. The mirrors formed by the reflecting material 62 and 64 allow the fiber 60 to act as a resonant cavity. However the reflectivities are made less than unity so that a small fraction of the light incident on a reflecting end 62 or 64 is transmitted through. The field sensing element 12 introduces a phase shift $\phi(P)$ in the light in the fiber 60. A laser 66 injects coherent light into the fiber 60 through one of the reflecting ends 62. Because the Fabry-Perot relies upon the interference of the light wave as it reflects between the ends 62 and 64, the coherence length of the laser radiation should be greater than the length of the fiber 60 multiplied by the factor $1/(1-r_1 \cdot r_2)$. An optical detector 68 aligned to the fiber 60 at its output end 64 produces a signal $I_1$ proportional to the intensity of the transmitted beam.

The detector output signal $I_1$ is given as a function of field induced phase shift $\phi(P)$ in FIG. (3a). The pattern, instead of being sinusoidal, is strongly peaked, with the peaks 70 and 72 separated by $\pi$ in phase. The dynamic sensitivity of the sensor is proportional to the slope of the static sensitivity shown in FIG. (3b). The slope of the side of the peak can be increased or alternatively the peak width narrowed by increasing the reflectivity $r_1$ and $r_2$ of the fiber ends 62 and 64. In order to operate at the point 74 of maximum slope of a peak 70 or at other selected points on the peak 70, a controllable phase shifter 38 is attached to the fiber as shown in FIG. (3a).

Although the sensitivity of Fabry-Perot sensor can be made very high, the interferometer shown in FIG. (3a) does not distinguish noise-induced phase shifts from the signal-induced phase shift $\phi(P)$. Thus the Fabry-Perot sensor is susceptible to phase noise and environmental conditions. Furthermore, the greater the dynamic sensitivity, the more susceptible the Fabry-Perot is to noise.

The interferometric sensor of this invention combines the sensitivity of a Fabry-Perot interferometer and the noise rejection of a single fiber polarimetric inter-ferometer. A generic polarimetric Fabry-Perot sensor as shown in FIG. (4a) uses a single optical fiber 72 with partially reflecting ends 62 and 64. The fiber 72, like that for the polarimetric sensor, must support two independent modes, here called the x-mode and y-mode. However the requirement for low coupling is made more stringent since the modes should not significantly couple over the fiber length multiplied by the factor $1/(1-r_1 \cdot r_2)$. A laser 74 launches equal amplitudes of the x-mode and y-mode into the fiber 72, by such means as a linear polarizer 44 set at 45° to the two modes. The requirement of coherence length on the laser radiation is the same as that for the laser of the Fabry-Perot sensor. A Wollaston prism 46 is placed beyond the output end 64 and set at an angle to divide the beam into an x-mode beam 76 and a y-mode beam 78. Separate optical detectors 80 and 82 measure the intensities of the two beams 76 and 78 and produce respective signals $I_x$ and $I_y$.

A sensing element 42 is coupled to the fiber 72 to sense the external field P 10 to be measured. This sensing element has the same requirements as that for the polarimetric interferometric sensor so that it introduces a differential phase shift $\delta\phi(P)$ in the two modes supported on the fiber 72.

The dependence of the detector signals $I_x$ and $I_y$ upon the incident field P is shown in FIG. (4b). The peaks 84 and 86 of the $I_x$ signal are separated by $\pi$ in phase as are the $I_y$ peaks 88 and 89. However the separations are different in the amount of the external field P as can be seen in the upper $I_x$ peak 86 occurring at a different P than the upper $I_y$ peak 89. The differences arise because of the field-dependent birefringence introduced in the fiber 72 by the sensing element 42 which causes a different phase shift in the x-mode than in the y-mode for a given change in external field P. This non-uniform response to P is required for the measurement of P. One peak 84 of $I_x$ and one peak 88 of $I_y$ are made to occur at the same field value of P, possibly zero, by use of a controlled differential phase shifter 58 coupled to the fiber 72 as shown in FIG. (4a). Furthermore the interferometer operating point is constrained to fall near the peaks 84 and 88 by use of a controlled common mode phase shifter 38 also coupled to the fiber 72. An alternative method to shifting common-mode phase involves finely shifting the frequency $\omega$ of the laser 74. As is apparent from Eq. (1), such a shift in frequency is equivalent to a phase shift as seen by the detector 80 or 82. The frequency of a solid state diode laser can be shifted by varying its operating current.

The principle of operation of the polarimetric Fabry-Perot sensor of FIG. (4a) is that any common-mode phase noise or environmental noise is manifested in nearly equal changes of $I_x$ and $I_y$ as shown in FIG. (4b). However field-induced phase shifts are manifested in unequal phase shifts $\phi_x(P)$ and $\phi_y(P)$ that result in unequal intensities $I_x$ and $I_y$. Any signal processing scheme which extracts the differential phase shift $\delta\phi(P)$ from the intensities $I_x$ and $I_y$ can be used for this invention.

One simple method of operating a polarimetric Fabry-Perot sensor is to set the operating conditions to points 90 and 91 on the steep slope of peaks 84 and 88. The intensities $I_x$ and $I_y$ are compared in a subtractor 90 and the difference $I_x - I_y$ is a measure of the field P. Although this method could be used in some situations, it doesn't utilize the full potential of the polarimetric Fabry-Perot sensor. For high dynamic sensitivity, the fiber ends 62 and 64 are made highly reflecting so as to produce very steep and narrow peaks 84 and 88. However noise is often high enough to push the system far away from the peaks 84 and 88 to points where the field-induced difference $I_x - I_y$ has little significance. Sensitive interferometer operation against a noisy background requires compensation to keep the operating points on the resonance near the peaks 84 and 88. preferably the same points on the resonances.

Such a polarimetric Fabry-Perot sensor system which measures field-induced phase shifts and which compensates for noise by feedback circuitry using a dither oscillator and lock-in amplifiers is shown in FIG. (5a). This embodiment further shows more detail in some of the components. Many of the components are repeated for FIG. (4a) and perform identical functions, namely; a laser 74, injecting two light modes into a polarization maintaining optical fiber 72 with partially reflecting ends 62 and 64, a differential phase sensor 42 for an external field 10, a Wollaston prism 46, separating the modes into their own beams 76 and 78, and optical detectors 80 and 82 for these two beams. The linear polarizer 44 set at any angle converts the laser beam into a polarized beam, while a quarter-wave plate 92 set between the linear polarizer 44 and a semitransmitting end 62 of the fiber converts the linearly polarized beam into a circularly polarized beam which consists of an x-mode and an y-mode which are of equal amplitude and are coherent. A piezoelectric stretcher 94 coupled to the fiber is used as a common mode phase shifter. A pincher 96 coupled to the fiber 72 is used as a differential mode phase shifter. Summing networks 98 and 100 control the stretcher 94 and pincher 96 respectively. A summing network adds the values of its inputs for a single output.

The system operates at a dither frequency $\Omega$ which is considerably higher than the frequency of the field P 10 or of any degrading noise. An oscillator 102 operating at the dither frequency drives one of the inputs of the stretcher summing circuit 98. The amplitude of the dither signal is relatively unimportant as long as it is larger than the noise but small enough to keep the interferometer on a narrow portion of any interference peak.

The outputs of the two optical detectors 80 and 82 are connected to their separate lock-in amplifiers 104 and 106. The output of the dither oscillator 102 is used as the reference signal for both lock-in amplifiers 104 and 106. A lock-in amplifier produces the signed amplitude of the Fourier component of its input signal referenced to the frequency and phase of its reference signals. Dependent upon the field 10, the noise, and the phase shifters, 94 and 96, the amplification factors and the time constants of the lock-in amplifiers 104 and 106 may need to be initially adjusted to eliminate unstable feedback loops. The polarities of the output need to be selected such that the signals fed to the stretcher 94 and pincher 96 drive the system to resonance rather than away.

The outputs of each of the lock-in amplifiers 104 and 106 are connected to their integrators 108 and 110 that produce an output signal proportional to the time integral of the input signal. This integration can be performed digitally or a capacitor with a current input and a voltage output serves as a satisfactory integrator. In turn, the integrators 108 and 110 are connected to bne of the inputs of the respective summing circuits 98 and 110. It has been found in many applications that by putting a long time constant on the output signals of the lock-in amplifiers 104 and 106, i.e. averaging the signal over a long time, the integrators 108 and 110 can be bypassed.

Manually adjustable DC voltage sources 112 and 114 are connected to the summing circuits 98 and 100 respectively and are used to bring the system to near resonance at which point the automatic feedback can control the system.

The operation of the control circuit can be understood by reference to FIG. (5b) which plots the intensity as sensed by an optical detector in curve 116 as a function of phase. The phase may be produced by the field P, noise, dither or by manual adjustment. If the system is operating at the peak 118 of the resonance when a dither signal 120 at $\Omega$ is applied, the resultant intensity signal 122 varies at a frequency $2 \cdot \Omega$. Because of the zero slope at the peak 118, there is no fundamental $\Omega$ term. Therefore a lock-in amplifier referenced to $\Omega$ would produce a zero output for the system operating at a resonance peak 118.

If however the system is operating at point 124 on the side of the interference resonance, there is a $\Omega$ term in the intensity signal 126 which the lock-in amplifier would measure. Note also that the lock-in output resulting from operating at a point 128 on the opposite side of the peak is of opposite polarity than that of the first point 124. Thus the lock in amplifier can be used to control a phase shifter which will drive the system towards the peak 118 of the resonance. The time integral of the lock in signal is a measure of the phase shift necessary to drive the system towards resonance. Such a control system can be used simultaneously on the stretcher 94 and pincher 96 to drive the system to the peak of the resonance of both the x-mode and y-mode. The time-integral correction signal to the pincher is a measure of field-induced differential phase shift and thus of the field signal.

It is believed that when the time-integrators 108 and 110 are replaced by long time constants on the lock-in amplifiers, 104 and 106, the system is not driven to the peak 118 of the resonance but instead settles at a stable point 130 somewhere between the peak 118 and the uncompensated point 124.

Other system configurations are possible that extract the differential signal from the fiber. A simple system shown in FIG. (6a) relies upon the sweep-to-sweep variation in the display of an oscilloscope 132. Many of the components perform the same function as these shown in FIG. (5a), namely, the laser 74, linear polarizer 44, quarterwave plate 92, the fiber 72 with two semireflecting ends 62 and 64, the differential sensing element 42 sensing the field P 10 and the stretcher 94.

The stretcher 94 is driven by a repetitive ramp generator 134 that has a repetition rate greater than the frequency of the field P 10 and an amplitude sufficient to drive the system through several resonances, i.e. it drives the stretcher 94 through multiples of $\pi$ in phase. The beam 136 leaving the exit end 64 of the fiber 72 impinges upon a single optical detector 138. The oscilloscope 132 triggered by the ramp generator 134 displays the output of the optical detector 138.

The display of the oscilloscope 132 will show a series of paired peaks. One peak 136 or 138 of the pair will be the interference resonance of the x-mode, while the other peak 140 or 142 will be due to the y-mode. The horizontal axis of FIG. (6b) is time but can be converted to phase by considering the voltage ramp of the generator 134 and the sensitivity of the stretcher 94. The x-mode peaks 136 and 138 differ by $\pi$ in phase as do the y-mode peaks 140 and 142. An x-mode peak 136 differs from a y-mode peak 138 by the birefringence of the fiber 72. The birefringence will vary with the field P 10. Therefore by monitoring the phase difference between an x-mode peak 136 and a y-mode peak 140 on successive sweeps, variations of the field P 10 can be followed. Common-mode noise will cause both peaks 136 and 140 to shift an equal amount.

The advantage of the polarimetric Fabry-Perot sensor is the high sensitivity associated with the narrowness of the resonances and the rejection of noise. Common mode noise, and phase noise are reduced by the factor $(n_x - n_y)/n$ where $n_x$ and $n_y$ are the effective indices of the polarization eigenmodes and n is the effective index of the lowest order fiber mode. The large common-mode rejection of phase instabilities (both source and thermal phase noise as well as environmentally induced) allows the detection of very low frequency fields in the hertz and sub-hertz range.

Obviously many modifications and variations of the present invention are possible in the light of the above teachings. It is therefore to be understood that, within the scope of the appended claims, the invention may be practiced otherwise than as specifically described.

What is claimed and desired to be secured by Letters Patent of the United States is:

1. A fiber optic interferometer for detecting an external field, comprising:
    an optical fiber waveguide capable of supporting two independent radiation modes, the two ends of the waveguide being highly reflecting, the input end of which is partially transmitting,
    means for launching coherent radiation of said two modes in fixed relation to each other into said input end of the waveguide,
    means for tuning said waveguide to near the resonances of said modes,
    means for sensing the external field to be detected that differentially affects said two modes simultaneously so that the differential mode signal of said two modes varies with said external field signal,
    and means for measuring said differential mode signal.

2. A fiber optic interferometer for detecting an external field signal, comprising:
    a fiber optic waveguide capable of supporting two independent orthogonally polarized light modes of substantially equal frequency, the two ends of said waveguide being highly reflecting, the input and output ends of which are partially transmitting;
    a coherent light source that launches said two modes of equal amplitudes into said input end of said waveguide;
    at least one phase shifter for tuning said waveguide to near the resonances of both said modes;
    at least one sensing element that senses the external field to be detected that differentially shifts the phase of said two modes whereby the differential mode phase signal varies with said external field signal; and
    means for detecting the differential phase shifts of the resonances of said two modes.

3. A fiber optic interferometer for detecting an external field signal, as recited in claim 2, wherein the means for detecting the differential phase shifts of the two modes comprises:

means for dividing the beam transmitted through said output end into two beams according to the polarization of light in said transmitted beam;

two detectors for measuring the intensities of said two beams; and means for comparing the output signals of said two detectors so that the comparison signal varies with the differential mode phase signal.

4. A fiber optic interferometer for detecting an external field signal, as recited in claim 2, wherein the means for detecting the differential phase shifts of the resonances comprises:

two detectors for measuring the intensities of said two modes transmitted through said output end of said waveguide; and feedback controls for compensating said waveguide to maintain the system at the same points on the resonances, whereby amount of differential compensation varies with the field.

5. A fiber optic interferometer for detecting an external field signal, as recited in claim 2, wherein the means for detecting the differential phase shifts of the resonance comprises:

at least one detector for measuring the intensity of the beam;

a repetitive ramp generator that drives one of the phase shifters; and means for detecting the variations in the time difference of the peaks measured by the detector on successive ramps of the ramp generator.

6. A fiber optic interferometer for detecting an external field signal, comprising:

an optical fiber waveguide capable of supporting two independent orthogonally polarized light modes of substantially equal frequency, the two ends of said waveguide being highly reflecting, the input end and output end of which are partially transmitting;

a coherent light source that launches said two modes of equal amplitudes into said input end of said waveguide;

phase shifters for tuning said waveguide to near the resonances of said modes;

at least one sensing element that senses the external field to be detected that differentially shifts the phase of said two modes whereby the differential mode phase signal varies with said external field signal;

means for dividing the beam transmitted through said output end of said waveguide into two beams composed of unequal contributions of two said light modes;

two detectors that measure the intensities of said two divided beams; and feedback circuitry from the outputs of said two detectors to said phase shifters that tune said waveguide to fixed points on the resonances of said two modes, whereby the amount of differential phase shift applied to said two modes is a measure of said external field signal.

7. A fiber optic interferometer for detecting an external field signal, as recited in claim 6, wherein:

one of the phase shifters is a common mode phase shifter that equally shifts the phase of both said modes; and one of the phase shifters is a differential mode phase shifter that unequally shifts the phase of both said modes.

8. A fiber optic interferometer for detecting an external field signal, as recited in claim 7, further comprising:

a polarization beam splitter on the outside of said output end of the fiber optic waveguide that directs the beams of said two modes onto said two detectors.

9. A fiber optic interferometer for detecting an external field signal, as recited in claim 8, further comprising:

a common mode lock-in amplifier, the signal-input of which is connected to the output of one said detector and the signal-output of which drives said common mode phase shifter;

a differential mode lock-in amplifier, the signal-input of which is connected to the output of the other said detector and the signal-output of which drives said differential mode phase shifter;

an oscillator operating at a dither frequency that drives one of the common-mode phase shifters and is also connected to the reference-input of both said lock-in amplifiers whereby said signal output of said differential mode lock-in amplifier varies with the external field signal.

10. A fiber optic interferometer for detecting an external field signal, as recited in claim 9, further comprising:

time integrators interposed on one or more of the driving lines connecting said lock-in amplifiers to the phase shifters.

11. A fiber optic interferometer for detecting an external field signal, as recited in claim 10, wherein said coherent light source comprises:

a laser;

a linear polarizer positioned between said laser and said input end of the waveguide; and a quarter-wave plate positioned between said polarizer and said input end of the waveguide.

12. A fiber optic interferometer for detecting an external field signal, as recited in claim 11, wherein said beam dividing means is a Wollaston prism.

13. A fiber optic interferometer for detecting an external field detecting an external field signal, as recited in claim 12, wherein:

the common mode phase shifter is a stretcher; and
the differential mode phase shifter is a pincher.

* * * * *